(12) United States Patent
Balissat et al.

(10) Patent No.: US 8,136,152 B2
(45) Date of Patent: *Mar. 13, 2012

(54) METHOD AND SYSTEM FOR SECURELY SCANNING NETWORK TRAFFIC

(75) Inventors: Joel Balissat, La Gaude (FR); Claude Galand, Saint-Paul (FR); Jean-Francois Le Pennec, Nice (FR); Jean-Marie Sommerlatt, Cagnes sur Mer (FR)

(73) Assignee: Worcester Technologies LLC, Wilmington, DE (US)

( * ) Notice: Subject to any disclaimer, the term of this patent is extended or adjusted under 35 U.S.C. 154(b) by 271 days.

This patent is subject to a terminal disclaimer.

(21) Appl. No.: 12/105,756

(22) Filed: Apr. 18, 2008

(65) Prior Publication Data

US 2008/0192930 A1    Aug. 14, 2008

Related U.S. Application Data

(63) Continuation of application No. 11/703,020, filed on Feb. 6, 2007, now Pat. No. 7,543,332.

(51) Int. Cl.
*G06F 15/00* (2006.01)
(52) U.S. Cl. .......................................... 726/15
(58) Field of Classification Search .................... 726/15; 380/44, 255, 282, 285
See application file for complete search history.

(56) References Cited

U.S. PATENT DOCUMENTS

| 5,732,275 | A | 3/1998 | Kullick |
| 5,745,701 | A | 4/1998 | Nguyen-Thai |
| 5,825,891 | A | 10/1998 | Levesque |
| 5,835,729 | A | 11/1998 | Shwed |
| 5,940,591 | A | 8/1999 | Boyle |
| 5,958,013 | A | 9/1999 | King |
| 5,983,350 | A | 11/1999 | Minear |
| 6,006,259 | A | 12/1999 | Adelman |
| 6,038,322 | A | 3/2000 | Harkins |

(Continued)

FOREIGN PATENT DOCUMENTS

EP    1 093 255    4/2001

(Continued)

OTHER PUBLICATIONS

U.S. Appl. No. 10/115,554, filed Apr. 4, 2002, Balissat.

(Continued)

*Primary Examiner* — Ellen Tran
(74) *Attorney, Agent, or Firm* — Turocy & Watson, LLP

(57) ABSTRACT

A method and system for implementing secure network communications between a first device and a second device, at least one of the devices communicating with the other device via a firewall device, are provided. The method and system may include obtaining an encryption parameter that is shared by the first device, second device and firewall device. A data packet sent by the first device may then be copied within the firewall device, so that decryption of the copy of the data packet within a portion of the firewall device may take place. In particular, the portion of the firewall device in which decryption takes place is defined such that contents of the portion are inaccessible to an operator of the firewall device. Thus, scanning of the decrypted copy of the data packet for compliance with a predetermined criterion may take place within the firewall device, without an operator of the firewall device having access to the contents of the data packet to be transmitted. Thereafter, the original data packet can be forwarded to its originally intended recipient.

20 Claims, 7 Drawing Sheets

U.S. PATENT DOCUMENTS

| | | | |
|---|---|---|---|
| 6,049,878 | A | 4/2000 | Caronni |
| 6,055,236 | A | 4/2000 | Nessett |
| 6,078,953 | A | 6/2000 | Vaid |
| 6,079,020 | A | 6/2000 | Liu |
| 6,091,820 | A | 7/2000 | Aziz |
| 6,092,200 | A | 7/2000 | Muniyappa |
| 6,105,027 | A | 8/2000 | Schneider |
| 6,182,226 | B1 | 1/2001 | Reid |
| 6,195,751 | B1 | 2/2001 | Caronni |
| 6,226,751 | B1 | 5/2001 | Arrow |
| 6,253,321 | B1 | 6/2001 | Nikander |
| 6,269,099 | B1 | 7/2001 | Borella |
| 6,275,588 | B1 | 8/2001 | Videcrantz |
| 6,289,382 | B1 | 9/2001 | Bowman-Amuah |
| 6,304,973 | B1 | 10/2001 | Williams |
| 6,330,562 | B1 | 12/2001 | Boden |
| 6,332,163 | B1 | 12/2001 | Siegel |
| 6,353,886 | B1 | 3/2002 | Howard |
| 6,496,867 | B1 | 12/2002 | Beser |
| 6,636,898 | B1 | 10/2003 | Ludovici |
| 6,662,221 | B1 | 12/2003 | Gonda |
| 6,684,336 | B1 | 1/2004 | Banks |
| 6,697,354 | B1 | 2/2004 | Borella |
| 6,826,684 | B1 | 11/2004 | Fink |
| 6,883,100 | B1 | 4/2005 | Elley |
| 6,915,437 | B2 * | 7/2005 | Swander et al. .............. 726/1 |
| 6,931,529 | B2 | 8/2005 | Kunzinger |
| 6,938,155 | B2 | 8/2005 | D'Sa |
| 6,954,790 | B2 | 10/2005 | Forslow |
| 6,976,177 | B2 | 12/2005 | Ahonen |
| 7,003,662 | B2 | 2/2006 | Genty |
| 7,028,335 | B1 | 4/2006 | Borella |
| 7,054,319 | B2 | 5/2006 | Akahane |
| 7,107,464 | B2 | 9/2006 | Shapira |
| 7,159,031 | B1 | 1/2007 | Larkin |
| 7,426,566 | B2 * | 9/2008 | Godwin et al. ............ 709/230 |
| 2001/0009025 | A1 | 7/2001 | Ahonen |
| 2001/0020273 | A1 | 9/2001 | Murakawa |
| 2001/0023443 | A1 | 9/2001 | Fichou |
| 2001/0047474 | A1 | 11/2001 | Takagi |
| 2001/0047487 | A1 | 11/2001 | Linnakangas |
| 2002/0016926 | A1 | 2/2002 | Nguyen |
| 2002/0052200 | A1 | 5/2002 | Arkko |
| 2002/0091921 | A1 * | 7/2002 | Kunzinger .............. 713/153 |
| 2002/0093915 | A1 | 7/2002 | Larson |
| 2002/0144144 | A1 | 10/2002 | Weiss |
| 2003/0018813 | A1 | 1/2003 | Antes |
| 2003/0061505 | A1 | 3/2003 | Sperry |
| 2003/0069958 | A1 | 4/2003 | Jalava |
| 2003/0135753 | A1 | 7/2003 | Batra |
| 2003/0154259 | A1 | 8/2003 | Lamberton |
| 2003/0191937 | A1 | 10/2003 | Balissat |
| 2004/0066747 | A1 | 4/2004 | Jorgensen |
| 2004/0093492 | A1 | 5/2004 | Daude |
| 2005/0088977 | A1 | 4/2005 | Roch |

FOREIGN PATENT DOCUMENTS

| | | |
|---|---|---|
| EP | 1 418 730 | 5/2004 |
| EP | 1 657 880 | 8/2007 |
| WO | WO 99/67930 | 12/1999 |
| WO | WO 00/19678 | 4/2000 |
| WO | WO 01/16766 | 3/2001 |

OTHER PUBLICATIONS

De Clereq, "An Architecture for Provider Provisioned CE-based Virtual Private Networks", Jun. 1, 2002, 17 page(s), France.

Gong, Li, "Enclaves: Enabling Collaboration Over the Internet" IEEE Journal on Selected Areas in Communications, IEEE Journal on Selected Areas in Communications, Apr. 1, 1997, 567-575 page(s), vol. vol. 15, No. 3, XP000683948, ISSN: 073-8716, IEEE Inc.

Hunt, "PKI and Digital Certification Infrastructure", Oct. 1, 2001, 6 page(s), US.

Younglove, "Public Key Infrastructure/ How it Works", Apr. 1, 2001, 4 page(s), US.

* cited by examiner

IPSEC ESP TUNNEL MODE

IPSEC ESP TRANSPORT MODE plus GRE

IPSEC AH TUNNEL MODE

IPSEC AH +ESP TUNNEL MODE

METHOD AND SYSTEM FOR SECURELY SCANNING NETWORK TRAFFIC

CROSS-REFERENCES TO RELATED APPLICATIONS

This application is a continuation of, claims priority to, and incorporates by reference herein in its entirety, U.S. patent application Ser. No. 11/703,020 now U.S. Pat. No. 7,543,332 filed 6 Feb. 2007, which claims priority to U.S. patent application Ser. No. 10/115,554 now U.S. Pat. No. 7,188,365, filed 4 Apr. 2002.

BACKGROUND OF THE INVENTION

1. Field of the Invention

The present invention relates to the formation and use of secure network connections. More specifically, the present invention relates to safely scanning network connections without sacrificing user privacy.

2. Description of the Related Art

Computer networks, and in particular Wide Area Networks (WANs) such as the Internet, provide opportunities for the misuse and abuse of communications traveling thereover. For example, two users communicating via the WAN may have their communications intercepted and/or altered. Also, it is possible for one user to misrepresent his or her identity to another user. As a final example, a user may utilize network resources and communications to disrupt all or part of the network.

Thus, there is a need for both privacy and authentication between users of the WAN communicating with one another. In other words, users should be able to rely on the fact that their transmissions will not be intercepted or altered, and that transmissions from someone purporting to be a particular user do in fact originate from that user.

One type of defense against ill-intentioned uses of the WAN is a device operating at the edge of a private network, such as a Gateway, Firewall or some other dedicated network appliance. Such a device operates to filter transmissions between the private network and the WAN and/or to protect the transmissions that do go through by encrypting/decrypting (i.e., encoding/decoding) those transmissions.

Other related types of defenses function by establishing the identity of a sender and/or recipient before sending/receiving a communication. Still other defenses include establishing a secure channel between two communicating devices.

A particular conventional protocol for providing security between devices operating over an Internet Protocol (IP) network is known as IPsec. Short for IP Security, IPsec is a set of protocols supporting the secure exchange of IP packets at a network layer. Two of the protocols used are the Authentication Header protocol (AH) and the Encapsulating Security Payload protocol (ESP).

AH is designed to ensure that transmitted packets are not altered during transit over the network, but does not protect the contents of the packets from being viewed by other users of the network such as intercepting parties. ESP, on the other hand, ensures the confidentiality of the packet contents. ESP provides an optional authentication mechanism; however, this mechanism is only for authenticating the data payload of the packet (and associated ESP headers/trailers). Therefore, ESP does not authenticate an IP Header of a packet indicating an original IP address on the network from which the packet originated. It is also possible to use AH and ESP in conjunction with one another, in order to achieve the advantages of both.

Whether using AH or ESP, IPsec operates in either transport or tunnel mode. Transport mode is often used in host-to-host communications; i.e., when the peer devices are the endpoints of communication. Transport mode is most useful within an overall IPsec environment including the two endpoints. Tunnel mode is typically used in communications between an IPsec-protected system and some other endpoint, such as communications sent from a private network over the Internet. In tunnel mode, the payload of a secured IP packet carries another packet containing the actual data payload to be transmitted.

A common use of the tunnel mode is to implement a Virtual Private Network (VPN). VPNs are networks that use publicly-available network resources, such as the Internet, to construct a network accessible only by selected parties. For example, a company may create its own version of a Local Area Network (LAN) using the Internet, or a worker working from a remote location may be able to utilize company resources at a company headquarters.

In order to implement the various protocols and modes of IPsec such as those discussed above, a security association (SA) is typically formed. An IPsec SA is essentially a contract or agreement between parties defining conditions according to which the two parties will communicate. For example, an IPsec SA is typically a one-way connection that defines, for example, encryption algorithms to be used during information exchange. SAs are defined by such parameters as an IP destination address and a security protocol identifier (e.g., AH or ESP). SAs typically include a security parameter index (SPI), which is a 32 bit identification number.

If an IPsec SA is considered a contract or agreement, then the terms thereof can be considered to be negotiated by a separate protocol (or manually). In other words, both communicating parties must agree on actions that will be taken on communicated packets in order to encrypt/decrypt those packets. One such protocol is known as the Internet Security Association and Key Management Protocol (ISAKMP), and one implementation of ISAKMP is known as the Internet Key Exchange (IKE).

IKE typically operates in two phases. In a first phase, parties agree as to how to protect further negotiation traffic. For example, IKE may authenticate a sender by virtue of, for example, public key encryption, also known as Diffie-Hellman encryption. In public key encryption, each user generates a public and private key, where the public key is then sent to the other party. When each user combines his own private key with the other's public key (and perhaps additional information), they each obtain an identical secret key. This secret key serves as a basis for deriving subsequent cryptographic keys.

In this way, a first user can encrypt a message using the second user's public key, and then only the second user (using his own private key) will be able to decrypt and receive the message.

Also, a first user can use his private key to sign a message and the second user, with the first user's public key, can receive and authenticate the transmitted message. Thus, the first user is authenticated to the second user as the one who sent the transmission; i.e., a "digital signature."

This latter methodology, however, does nothing to guard against the eventuality that a third party is merely pretending to be the sender (i.e., the first user) when the keys were generated in the first place. Therefore, independent and trusted Certification Authorities (CAs) exist which issue digital certificates verifying the association of a public key with a particular user, along with other identifying information.

There are two primary modes for phase 1 of IKE: main mode and aggressive mode. Main mode, generally speaking, is a more involved but more secure method. Aggressive mode, though faster, sacrifices identity protection; however, using the public key encryption methodology just discussed obviates the need for this feature.

In a second phase, IKE negotiates the actual IPsec SA (over which the actual application layer data exchanges will take place) by setting up the encryption/authentication keys for the AH and/or ESP protocols. In particular, "quick mode" negotiates the SAs for general purpose IPsec communications. Also, it should be noted that, typically, only one phase I negotiation is needed for an associated plurality of phase 2 operations by a plurality of peer devices. This allows the multiple peer devices to each take advantage of the phase I proceedings, thereby establishing secure connections more quickly and more easily.

As shown in the above discussion, therefore, various solutions exist for implementing private and authenticated network communications.

However, the various conventional solutions suffer from a variety of shortcomings. For example, it is often the case that one device participating in a secure network connection such as IPsec is located behind a gateway or firewall device. As is known, such devices are typically located on the edge of a private network, and serve to intercept and/or route traffic between the private network devices and other devices, frequently via a public network such as the Internet. Firewalls may be implemented by, for example, corporate network administrators and Internet Service Providers (ISPs).

Such firewall devices conventionally serve a number of functions; for example, they are often used to scan or filter network traffic so as to prevent unauthorized data or data types from entering the private networks. In this way, firewalls may prevent viewing of sites prohibited by network administrators, such as gambling sites on the Internet. They may also prohibit data that is deemed likely to contain viruses or other files that could prove harmful to the network. Firewalls may also be used as the sole entry point to the private network from outside of the private network, so that network administrators may require a username/password combination at the firewall in order to allow only authorized users access.

Conventional firewalls, however, are not designed to operate well in conjunction with security protocols discussed above, such as IPsec. For example, if a device on a public network wishes to communicate securely with a device operating behind a firewall on a private network, no satisfactory solution exists.

One conventional solution in this scenario is to simply let encrypted data pass unhindered through the firewall. This solution is shown in FIG. 1A, where devices 100 and 140 (operating on public and private networks 120 and 130, respectively) communicate via firewall 110. However, this solution suffers from the obvious problem that it does not allow the firewall to perform its function of scanning/filtering the data, and may therefore let harmful or undesirable traffic onto the private network.

Another solution would be to establish a secure channel between the remote device and the firewall. Then, decryption can occur at or before the firewall, after which the decrypted packets can be scanned/filtered and forwarded to the recipient device within the private network. However, this solution suffers from the fact that operators of the firewall will have access to the decrypted information intended for the recipient device. In other words, typically a firewall device is not a customer device; it is a service provider device, and, as such, it is not typically secure or desirable (from the customer's viewpoint) to allow access to decrypted packets there. Moreover, if it is necessary to establish a second secure connection between the firewall and the device on the private network in order to re-encrypt the data packets (e.g., negotiate a second SA and set up a second IPsec session), then non-negligible computing resources must be devoted to this task.

Therefore, what is needed is a system and method for establishing a secure connection between a private network device and a second device, even over a WAN such as the Internet, without permitting a firewall operator to access a content of data transmitted via the connection.

SUMMARY OF THE INVENTION

In a first exemplary embodiment, the present invention relates to a method for implementing secure network communications between a first device and a second device, at least one of the devices communicating with the other device via a separate computer. Such a method may comprise obtaining an encryption parameter that is shared by the first device, second device and separate computer and copying a data packet sent by the first device, within the separate computer. Thereafter, the method may comprise decrypting the copy of the data packet within a portion of the separate computer, wherein contents of the portion are inaccessible to an operator of the separate computer. Finally, the method may comprise scanning the decrypted copy of the data packet for compliance with a predetermined criterion associated with the separate computer for allowing transmissions therethrough.

In a second exemplary embodiment, the present invention relates to a firewall device for mediating communications between a private network device and a device external to the private network. Such a firewall device may comprise an encryption parameter determining circuit operable to determine an encryption parameter that is known to the external device and the private network device, as well as a content scanner containing the encryption parameter and operable to decrypt contents of a transmission from the external device for scanning, said contents being encrypted with said encryption parameter, said decrypted contents being inaccessible to an operator of the firewall device. In the firewall device, the content scanner may permit a forwarding of the transmission to the private network device upon a determination that the contents of the transmission comply with a predetermined criterion of the firewall device.

In a third exemplary embodiment, the present invention relates to an article of manufacture, which comprises a computer readable medium having stored therein a computer program carrying out a method for scanning contents of an encrypted data packet. Such a computer program may comprise a first code segment for acquiring an encryption parameter used by a first and second device to encrypt a data packet that is transmitted therebetween via the article of manufacture, as well as a second code segment for decrypting the data packet, using the encryption parameter. The computer program may further comprise a third code segment for restricting a user of the article of manufacture from accessing contents of the data packet. Finally, the computer program may comprise a fourth code segment for filtering the data packet based on whether the contents comply with a predetermined criterion associated with the article of manufacture.

In a fourth exemplary embodiment, the present invention relates to a method of transmitting data. Such a method may comprise constructing a first encryption parameter with a firewall device that receives and forwards traffic intended for a private network device associated therewith, and thereafter constructing with the firewall device, based on the first encryption parameter, a second encryption parameter that was previously negotiated between the firewall device and the private network device. The method may further comprise receiving at the firewall device a transmission that is encrypted using the second encryption parameter, and thereafter sending the received transmission from the firewall device to the private network device.

In a fifth exemplary embodiment, the present invention relates to a method of transmitting data. Such a method may comprise constructing an encryption parameter with a recipient device through a firewall device and sharing the encryption parameter with the firewall device. The method may further comprise encrypting a transmission using the encryption parameter. Finally, the method may comprise sending the transmission to the recipient device via the firewall device.

In a sixth exemplary embodiment, the present invention relates to a method of filtering encrypted data at a firewall device. Such a method may comprise partitioning a filtering portion of the firewall device from an operator thereof, decrypting the encrypted data within the filtering portion and forwarding the data if it complies with at least one filtering rule associated with the firewall device.

In a seventh exemplary embodiment, the present invention relates to a firewall device. Such a firewall device may comprise means for obtaining an encryption parameter common to both a first device and a second device, means for decrypting encrypted data transmitted from the first device using the encryption parameter and means for forwarding the encrypted data to the second device.

The features and advantages of the invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

While the present invention is described below with respect to various exemplary embodiments, the present invention is not limited to only those embodiments that are disclosed. Other embodiments can be implemented by those skilled in the art without departing from the spirit and scope of the present invention.

In this regard, although IPsec is used herein to demonstrate an exemplary embodiment of the invention, it should be understood that the present invention can be utilized in the context of other conventional network security protocols, such as Layer 2 Tunneling Protocol (L2TP) and Point-to-point Tunneling Protocol (PPTP), as would be apparent. Similarly, other protocols/methodologies besides IKE and public key encryption exist which are useful in implementing network security protocols, and the present invention can be implemented in those environments as well.

Moreover, it should be noted that the terminology and associated definitions used herein are subject to some level of disagreement in the art, as is known. For example, some artisans will describe IKE as an instance of ISAKMP, whereas others will describe IKE as the combination of ISAKMP with certain other protocols. Such terminology and definitions are used singularly and consistently herein only for the purposes of clarity; therefore, it should be understood that such usage is designed merely to explain and not limit the present invention. Similarly, terms such as "encryption," "encryption parameters" or any other term of art, unless otherwise specified or limited herein, are not intended to be re-defined to have a special meaning herein and should be given their broadest reasonable interpretations consistent with the conventional understanding in the art.

Figure 1A:
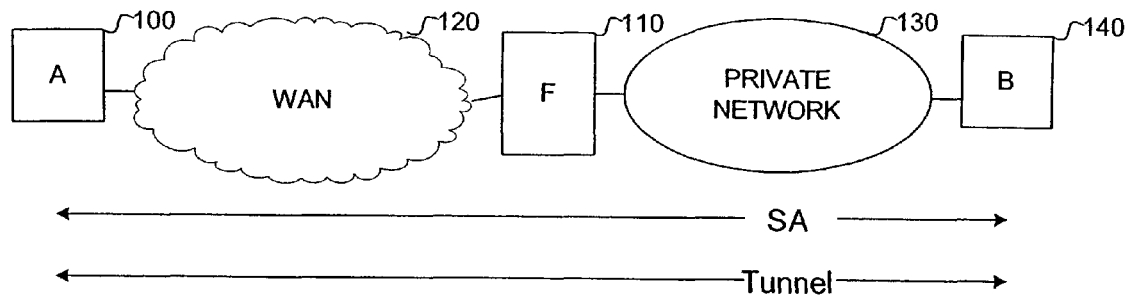
FIG. 1A demonstrates a prior art networking environment.

The present invention, in an exemplary embodiment, operates by modifying the functionality of a conventional firewall device operating on the edge of a private network and communicating with another device via a public WAN, such as the Internet. This configuration is shown in both of FIGS. 1A and 1B, where device 140 operates on a private network 130 behind firewall or other dedicated network appliance 110, and communicates via WAN 120 (such as the Internet) with device 100. Note that device 100 could be a single device on WAN 120, or could be operating on its own private network or according to any other conventional network configuration, as would be apparent.

Modifications of such a firewall 110 according to one embodiment of the invention are implemented in the establishment of a security association(s) (SA(s)) for an IPsec session(s) involving devices 100 and 140, as well as in a forwarding mechanism for the packets being exchanged according to these established parameters.

According to one embodiment of the invention, firewall 110 acquires information such as an encryption parameter(s) that allows it to decrypt (and thereafter scan) incoming data. However, this information is restricted to a pre-determined portion of the firewall, such as a single hardware chipset, from which it may not be extracted by an operator of the firewall.

In this way, a copy of an incoming data packet can be made and forwarded to the pre-determined portion such as the single chipset; there it can be decrypted and scanned for compliance with firewall rules. Afterwards, only an affirmative/negative response need be provided by the chipset, whereupon the original version of the data packet (which may be buffered upon its entry to the firewall 110) can be passed on by the firewall 110 to recipient device 140. The copy of the data packet may then simply be deleted from the chipset where it was decrypted.

Figure 1B:
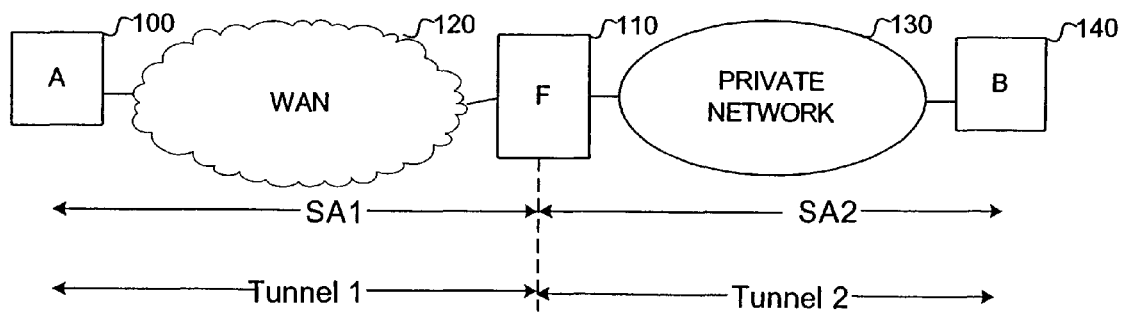
FIG. 1B demonstrates a network environment in which one embodiment of the present invention might operate, including a firewall operating on the edge of a private network and communicating with another device via a public WAN.
Figure 2:
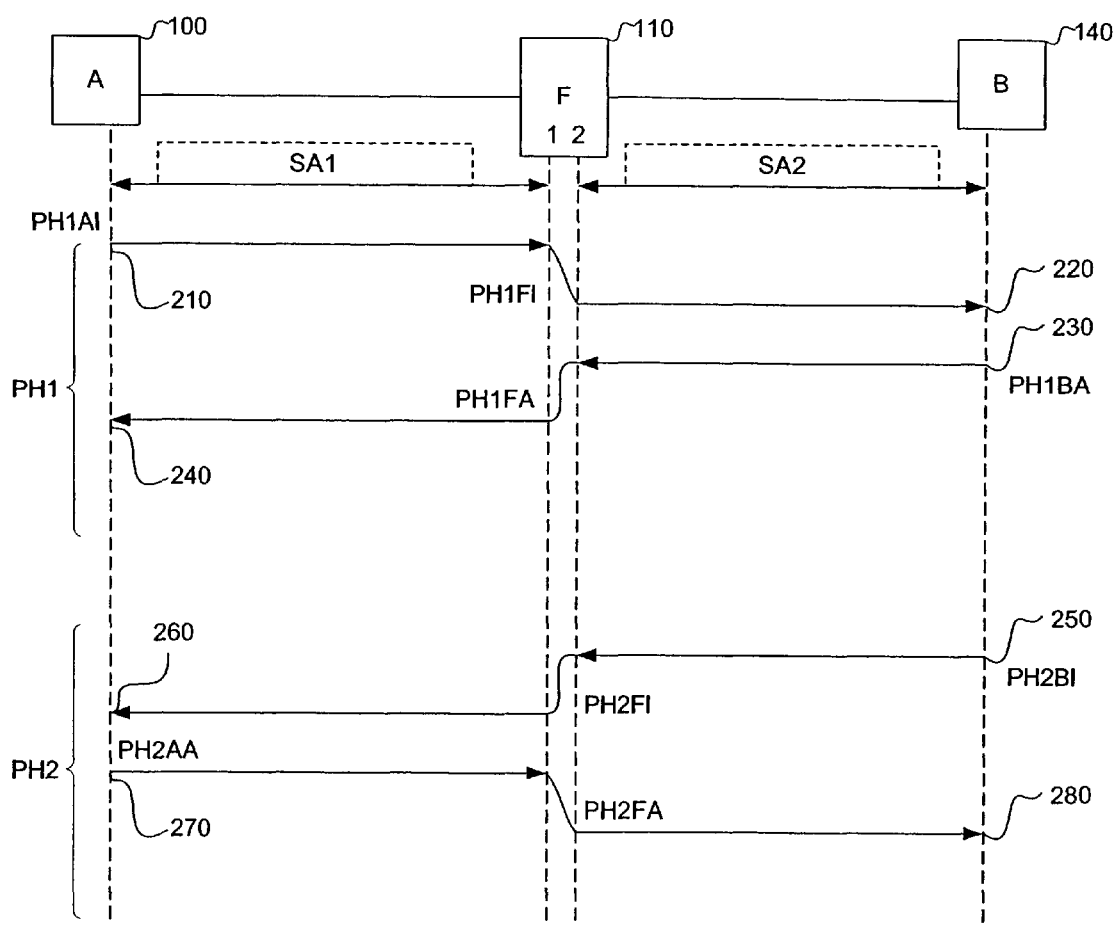
FIG. 2 demonstrates a methodology for negotiating a pair of SAs according to the embodiment of the invention shown in FIG. 1B.

In one embodiment of the invention, as discussed with respect to FIGS. 1B and 2, two separate SAs and associated IPsec sessions can be negotiated, with firewall I 10 forwarding parameters between devices 100 and 140. In this embodiment, the three devices collaborate to build a common secret key.

Figure 7:
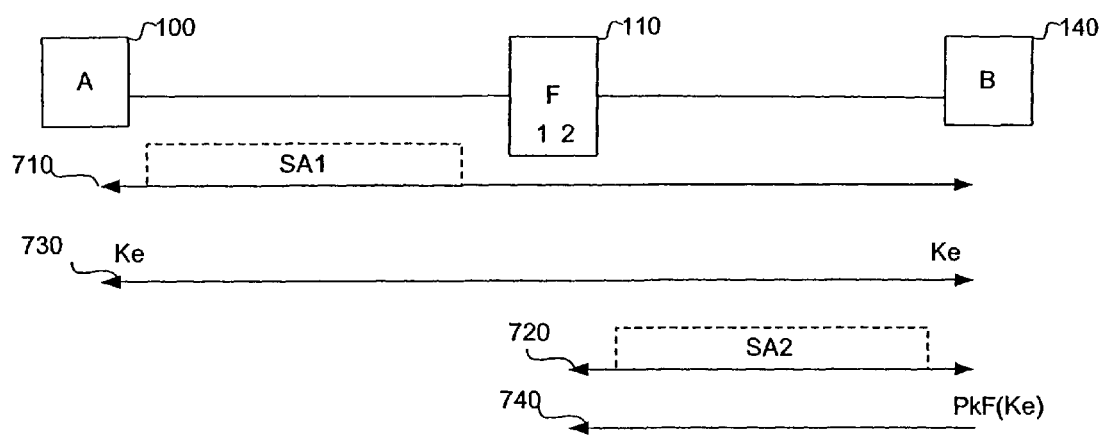
FIG. 7 demonstrates a methodology for negotiating a pair of SAs according to an alternate embodiment of the invention.

In another embodiment of the invention, as discussed with respect to FIG. 7, a first SA may be established between devices 100 and 140, and a second SA may be established between devices 110 and 140. Here, devices 100 and 140 first establish a secret key together via the first SA. Device 140 then uses a public key of firewall 110 to pass encrypt and pass the secret key to firewall 110, to be used as described above during IPsec transmissions.

In either embodiment, it will be assumed for the purposes of explanation that an IP address of device 140 will generally be available to device 100 over the public network 120. However, if this is not the case due to the presence of device 140 on private network 130 that restricts access to its member device addresses, then it may be necessary to implement some additional measure(s) for allowing devices 100 and 140 to communicate securely. One such exemplary methodology is described in detail in co-pending Application No. (insert number here), which is hereby incorporated herein by reference.

In FIG. 1B, as just described, a device 100 is shown as negotiating SA1 with firewall 110. Firewall 110 negotiates a second SA, SA2, with device 140. Thereafter, separate IPsec tunnels 1 and 2 are implemented which allow devices 100 and 140 to securely communicate with one another. During the negotiation of SA1 and SA2, firewall 110 gains access to an encryption parameter that allows it to decrypt information sent between devices 100 and 140. However, decryption of the information occurs only within a portion of firewall 110 that is off-limits to an operator of the firewall 110. This portion may thus acquire a copy of incoming data packets, decrypt the copy, scan the copy for compliance with firewall rules, and allow/deny entry of the encrypted packet through the firewall 110 and onto private network 130.

FIG. 2 demonstrates a methodology for negotiating a pair of SAs according to the embodiment of the invention shown in FIG. 1B. In FIG. 2, device 100 seeks to initiate an SA with device 140. Note that device 100 may itself be a gateway or firewall device, or it may be a router or simply a host connected to WAN 120.

As discussed above, an SA describes operations that should be applied to future data packets including an authentication method, an encryption method (and associated algorithm), authentication/encryption keys and various other parameters (such as the Security Parameter Index (SPI), an effective lifetime of the key(s), etc.). IKE allows two devices to negotiate and agree on these operations, including the establishment of the keys. As also noted above, it will be assumed for the purposes of this description that device 100 has access to a device address of device 140, such as its IP address.

In FIG. 2, device 100 initiates a phase 1 session (PH1) for the first of the two conventional phases in negotiating an SA using IKE. In this embodiment, device 100 sends a message 210 to firewall 110 at an IP address F1 of the firewall that may be advertised (i.e., made public) over WAN 120. This message, as discussed above, is generally intended to protect further negotiation traffic by way of, for example, the Main mode. As is known, the Main mode provides protection for the identity of the involved devices. It is typically divided into three sets of messages, each set containing two messages. The first two messages are used for negotiating a security policy for the exchange, the next two messages are used for the Diffie-Hellman keying material exchange and the last two messages are used for authenticating the peers, such as with digital signatures and optional digital certificates.

In one embodiment of the invention, device 100 may be preset such that it believes that address F1 is an address for device 140. In this scenario, firewall 110 may be aware upon reception of transmission 210 which device with which it will then establish a secondary SA, SA2, without having to inspect the details of the SA transmission 210. This implementation may utilize "loop-back" addresses on firewall 110, one for each possible peer on private network 130. In other words, there will be a different address F1 associated with each of the private network devices.

Another implementation utilizes a single F1 IP address for all IPsec flows on the WAN side. In this solution, firewall 110 must examine the transmission 210 to determine which private network device will be the tunnel endpoint for communications with device 100. This implementation has the advantage that a device 100 can communicate with a plurality of devices on private network 130, while itself needing to establish an SA(s) only with firewall 110 (i.e., one SA per destination device).

In the latter implementation there is a need to maintain a name and identity of device 100, either locally at the firewall 110 or at a Domain Name System/Server (DNS). This information can also be used to identify device 140 as the sought-after device.

It should be noticed that SA2 may start by using a similar message 220 upon reception by firewall 110 of the first SA1 message. In the various scenarios discussed above, in cases where firewall 110 does not know the identity of the destination device 140 by one of the above-defined methods, it will wait for an SA message from device 100 containing an identification payload. In such a case, firewall 110 should proceed with a phase 1 negotiation with device 100 until this message is received.

FIG. 2 describes only the case when either the identity of device 140 is included in the first message 210 or is already known by firewall 110. One limitation when the destination identity is not known is that firewall 110 should not start negotiating parameters which may turn out to be unsuitable for device 140; a solution in this case is to define a common set of rules which will be accepted by all devices on private network 130.

Assuming firewall 110 is aware of the identity of device 140, firewall 110 may then start a secondary phase 1 SA message 220 for SA2, using another IP address F2 for firewall 110 that belongs to private network 130 and to which device 140 will be able to answer. Device 140 is now the SA responder and will answer to firewall 110 using a PH1BA type message 230. In other words, device 140 will receive parameters associated with device 100 but having address F2, and will respond with its own parameters to that address.

Afterwards, firewall 110 responds to the first SA message 210 and provides a similar answer PH1FA message 240 to device 100. In other words, the same parameters are negotiated between firewall 110 and device 100 as between firewall 110 and device 140. The two SAs are thus independent, but will negotiate the same rules and parameters thanks to the interleaving of the SA messages.

At this point firewall 110 provides its own authentication parameters, such as its own authentication public key, but uses the identity of device 140. If this checking is done via certificates, then the certificates will be defined according to FIG. 6, as will be discussed.

It should be noted that the SA mechanisms between device 100 and firewall 110 on one side and device 140 and firewall 110 on the other side fully meet the IKE protocol rules and process, so that no change is required on devices 100 or 140, which are therefore transparent to this implementation.

Once phase 1 is achieved, a fully secure authenticated channel with possible encryption is established in order to proceed with SA phase 2. Phase 2 allows the definition of parameters for the IPSec protocol itself, and generally makes use of the Quick mode discussed above. A Diffie-Hellman key exchange may be done to achieve forwarding secrecy.

As referred to above, the conventional Diffie-Hellman methodology allows two users to build a symmetric secret key (same key used for encryption and decryption) using their local private keys, a known Diffie-Hellman (DH) key and the other device's public key (which can either be transmitted via firewall 110, or is obtained from a certificate).

Although conventionally implemented for two users as just explained, this methodology can be extended for any number of users. According to this embodiment of the present invention, a secret shared key can be developed using the Diffie-Hellman algorithm that is common to all of devices 100, 110 and 140.

For example, at the beginning of a use of the Diffie-Hellman algorithm, device 100 having address A generates a private key referred to as "a." A corresponding public key will have the form $T_a = g^a$, where the parameter "g" is a known parameter according to the Diffie-Hellman algorithm, i.e., the DH key. Similarly, firewall 110 will have private key "f" and public key $T_f = g^f$, while device 140 will have private key "b" and public key $T_b = g^b$.

Thereafter, device 100 may send public key $T_a$ to firewall 110, which can then calculate a secret key $S_{af} = (T_a)^f = g^{af}$. Firewall similarly sends $T_f$ to device 100, which can then calculate the secret key $S_{fa} = (T_f)^a = g^{af} = S_{af}$. Thus, devices 100 and 110 share a common secret key, hereafter referred to as "C."

Once devices 100 and 110 share key C, they may each calculate the same public key $T_C = g^C$. Device 140 having private key "b," meanwhile, calculates public key $T_b = g^b$, as already pointed out.

Thereafter, device 140 sends $T^b$ to firewall 110, which can calculate secret key $S_{bC} = (T_b)^C = g^{bC}$. Firewall similarly sends $T_C$ to device 140, which can then calculate secret key $S_{Cb} = (T_C)^b = g^{Cb} = S_{bC}$.

Finally, to upgrade the secret shared key C with device 100, the firewall 110 forwards $T_b$ to device 100, and then device 100 can compute the new secret key in the same manner as just performed by firewall 110, using secret key C which it already posses from before, i.e.: $S_{bC} = (T_b)^C = g^{BC}$.

In short, devices 100 and 110 calculate a secret key shared therebetween. Thereafter, devices 110 and 140 calculate a second secret key shared therebetween, using the first secret key. Finally, device 100 is able to calculate the second secret key using the first secret key and the public key of device 140. Thus, all three devices share the (second) secret key in common, which can be used for encrypting/decrypting IPsec packets.

Another way of describing the same method is to say that device 100 calculates the secret key using its common secret key (C) established with device 110, the DH key and the public keys of device 140, while device 140 calculates the same secret key using its own local private key, the DH key and the common public key ($T_C$) of devices 100 and 110. The common secret key ($S_{bC}$), once calculated by firewall 110, should only be stored within, for example, a hardware chipset that is not accessible by an administrator of the firewall.

Note that in this description, the secret key is calculated twice between devices 100 and 110. However, device 140 may also initiate the exchange(s). In either case, only one of the two end devices should have to perform the two-step secret key calculation.

As long as the SAs between device 100 and firewall 110, and between firewall 110 and device 140, are valid, the same secret key is valid. Therefore the same parameters of key lifetime should typically be negotiated both ways.

Either one of the devices 100 or 140 might initiate the quick mode exchange associated with phase 2 SA negotiations. In FIG. 2, device 140 is the initiator of the second phase starting with PH2BI message 250. Firewall 110 rebuilds a similar message PH2FI 260, where the authentication (public) key of device 140 is replaced with a computation of the public keys of devices 110 and 140 together (since device 100 will need the parameter of device 140 for the secret key computation, as just described).

Device 100 answers with its own parameters in PH2AA message 270 to firewall 110, and the firewall 110 forwards the message including the same parameter values, except for the authentication key of device 100, which is exchanged for a combination of itself and the key of firewall 110, to device 140 in PH2FA message 280.

Note that an additional message may be sent by Firewall 110 to provide device 100 with the IP address to use during the IPsec session as the address for device 140, especially when the SA IP address for device 140 is not the same as the one used for IPsec traffic.

A last message that can be viewed as a final acknowledge is also sent back which is not shown in FIG. 2. Such a message ends the SA(s) for IPsec traffic between devices 100 and 140. As SAs are typically asymmetrical, it may be necessary to repeat the above-described process in the reverse direction. However, it may be necessary only to perform a phase 2 negotiation, as is known. Once all SAs are active, the IPsec traffic can start in both directions.

Figure 3:
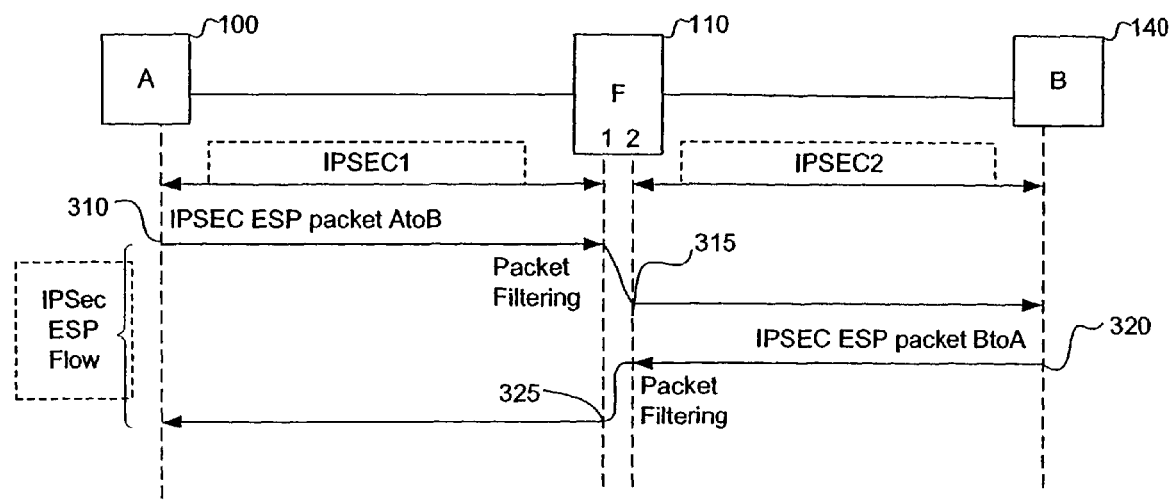
FIG. 3 describes an embodiment of the invention in which various types of IPsec traffic is relayed through a firewall computer both ways between a pair of devices.

FIG. 3 describes IPsec traffic both ways between devices 100 and 140 through firewall 110. In FIG. 3, only an ESP header is used (i.e., as explained above, encryption is involved but no full packet authentication is necessarily provided). AH may be used in conjunction with ESP if full packet authentication is required, as is known; however, this scenario is not explicitly shown in FIG. 3. In the case where AH is used alone without encryption (i.e., with a packet using the format described in FIG. 4C, below), the firewall 110 can simply perform conventional filtering (since the present invention will not be needed in that scenario).

In FIG. 3, a first IPsec packet is sent from device 100 to firewall 110 in step 310. When firewall 110 recognizes a packet having F I as destination address, it first checks a protocol field ("PROT") field in the packet in order to know which process to use. The PROT will indicate whether to use an IPSec ESP flow process or an IPSec AH (+ESP or not) flow. In step 310, the protocol is ESP, and therefore firewall 110 has to copy the packet, store (buffer) the original, decrypt the copied payload and scan the copied payload content. If the copied packet is valid, the original is then forwarded to device 140; otherwise, the packet is discarded and a message can be logged to that effect for network management purposes. Note that the original, buffered packet is forwarded to device 140; in this way, no re-encryption is performed in firewall 110, and the packet can be easily and quickly forwarded upon approval of the copied and scanned version of the packet.

Figure 4A:
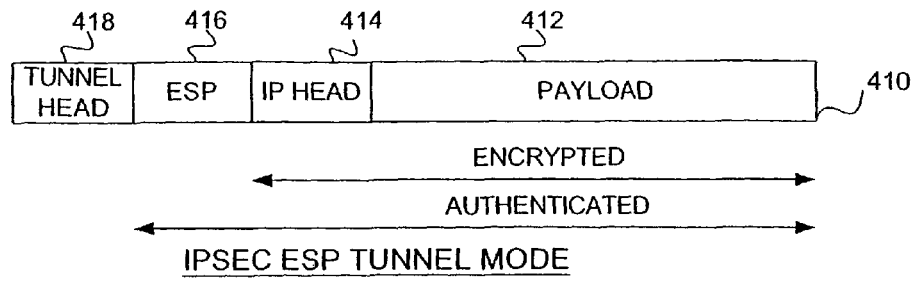
FIGS. 4A, 4B and 4D describe structures of exemplary IPsec packets that may be transported according to various embodiments of the invention.
Figure 4B:
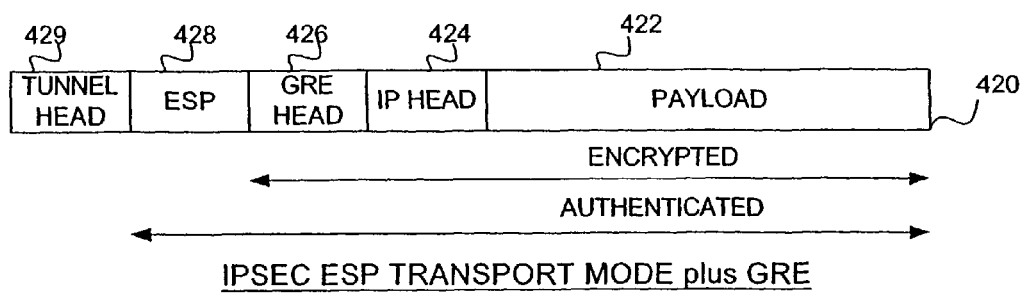
Figure 4C:
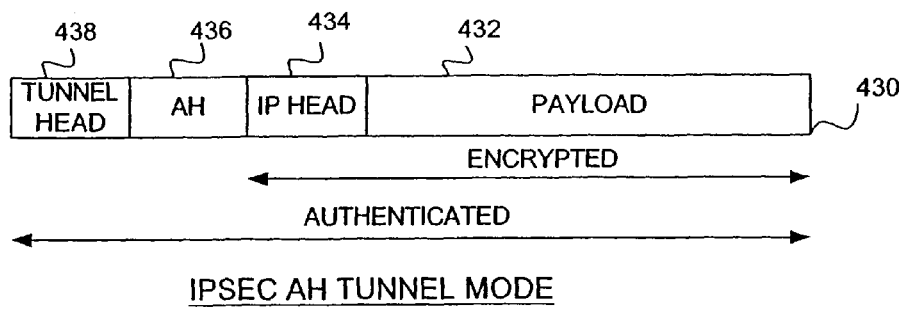
FIG. 4C describes an exemplary IPsec packet that does not require specialized scanning related to the present invention.
Figure 4D:
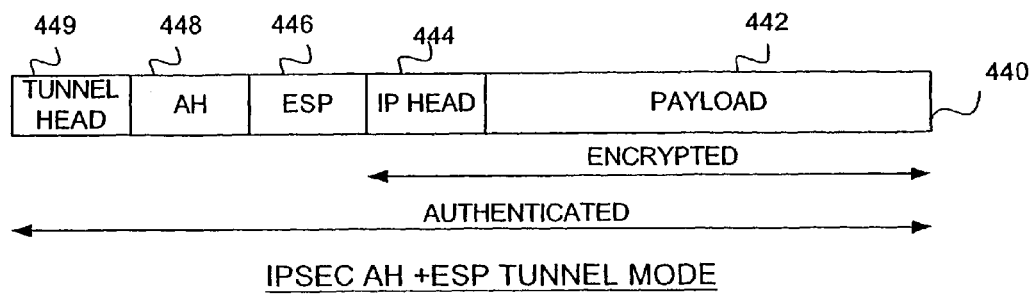

FIGS. 4A, 4B and 4D describe structures of exemplary IPsec packets that may be transported according to various embodiments of the invention. FIG. 4C describes an exemplary IPsec packet that does not require specialized scanning related to the present invention.

In FIG. 4A, packet 410 represents an IPsec packet using IPsec tunnel mode with an ESP header 416. The inner payload 412 and IP header 414 are encrypted, while the entire packet except the tunnel header 418 is authenticated (i.e. integrated in the packet signature).

In FIG. 4B, packet 420 represents an IPsec packet using IPsec transport mode with ESP header 428 and Generic Routing Encapsulation (GRE) tunneling. The inner payload 422 and IP header 424 as well as the GRE portion 426 are encrypted, while the entire packet except the tunnel header 429 is integrated in the packet signature (i.e., authenticated).

In FIG. 4C, packet 430 represents an IPsec packet using IPsec tunnel mode with AH header 436. No field is encrypted, while the entire packet including the tunnel header 438 is integrated in the packet signature. Therefore, no special process according to the present invention is done in firewall 110 with such packets. Rather, they are just monitored by a legacy firewall function capable recognizing the AH header in order to properly locate the original IP header and payload.

In FIG. 4D, packet 440 represents an IPsec packet using IPsec tunnel mode with AH and ESP headers 448 and 446, respectively. The inner payload 442 and IP header 444 are encrypted, while the entire packet including the tunnel header 449 is integrated in the packet signature.

Figure 5:
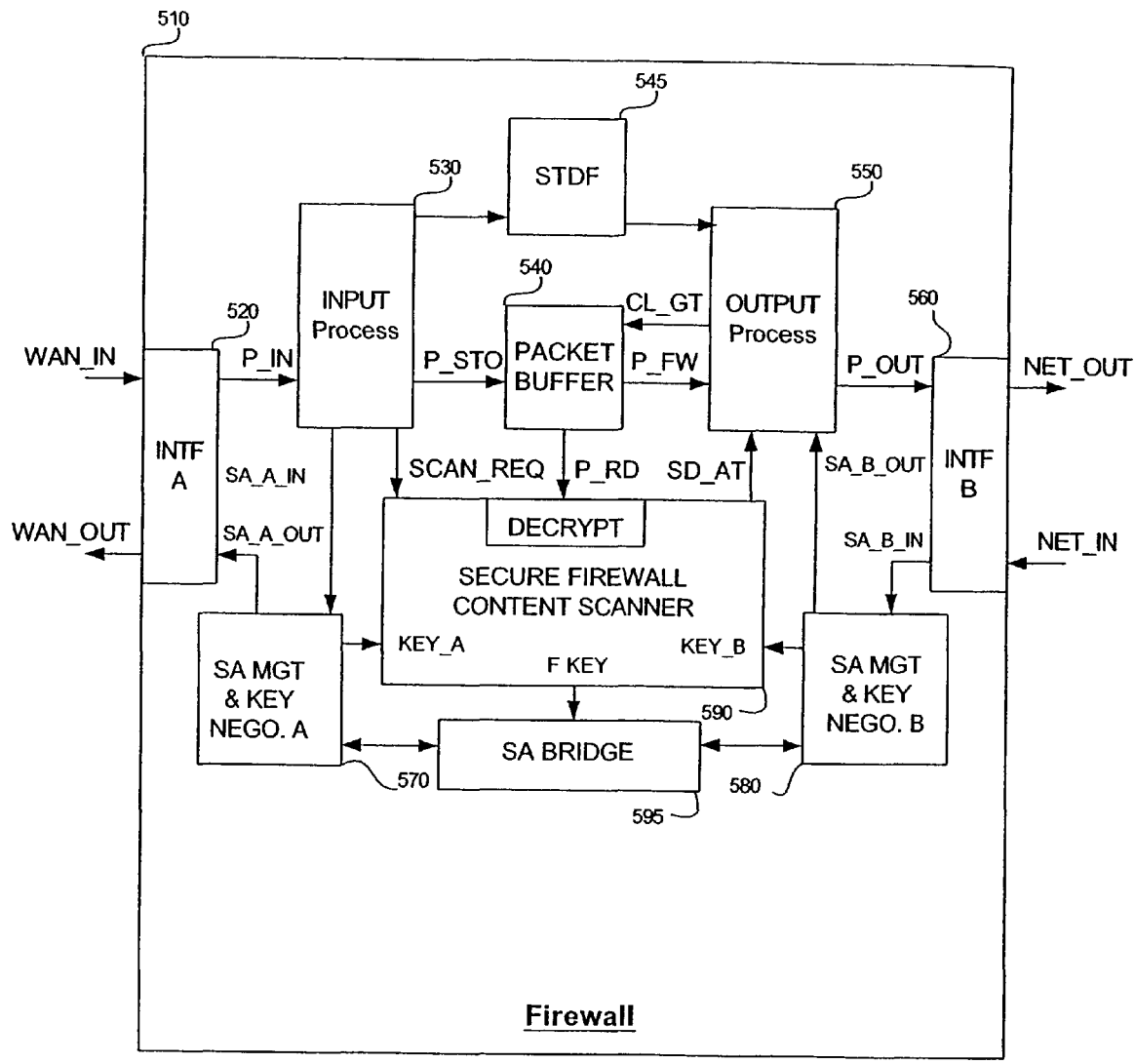
FIG. 5 demonstrates exemplary hardware components of a firewall computer according to one embodiment of the invention.

FIG. 5 demonstrates exemplary hardware components of a firewall computer 510 according to one embodiment of the invention.

Firewall 510 includes two interfaces with which to interact with the two external networks 120 and 130. The first interface INTF A 520 has one input WAN_IN and one output WAN_OUT. When a packet arrives on WAN_IN interface, it is transmitted to the INPUT process block 530 via P_IN leads and data bus. This process determines whether the packet is a data packet (which may or may not be encrypted), or if it is an SA message marked for interception by Firewall 510.

In the latter case, the packet is transmitted via SA_A_IN lead to the SA management and key negotiation block of the WAN side, i.e., SA MGT & KEY NEGO. A 570. At this point, the process described in FIG. 2 is performed; this process may involve message modification, coding or decoding and/or an answering transmission(s) to device 100 via an SA_A_OUT lead. Similarly, when an SA message is received from device 140 on INTF B 560, it is received on SA MGT & KEY NEGO. B 580 via SA_B_IN. Answers to an SA message from device 140 are sent using an SA_B_OUT lead to OUTPUT process 550, which serves to queue all packet flows.

Information is sent from one SA management block (570, 580) to the other by way of SA BRIDGE 595. SA bridge may serve to perform the Diffie-Hellman $3^{rd}$ party computation and key creation described above, using Firewall 510 public key $T_f$ given to devices 100 and 140. In addition, the encryption public key from device 100, $T_a$, is sent by block 570 to block 590 and similarly the encryption Public Key from B is sent by block 580 to block 590. In this way, Secure Content Firewall Scanner 590 is able to compute the secret shared key using the encryption public keys $T_a$ and $T_b$ together with its own encryption private key "f." Therefore, the secret key always remains secure in chip 590, and is never visible to users or administrators of the firewall, nor may it be found using hardware analyzers.

When the packet is a conventional, unencrypted IP packet (or a packet using only an IPsec AH header, as shown in FIG. 4C), rather than an SA message, the packet is forwarded by INPUT process 530 to standard firewall function STDF 545, which performs all necessary filtering and/or data scanning, as necessary. Then, if not filtered out, the packet is forwarded to OUTPUT process 550 for queuing for export to interface INTF B 560. The packet will then be transmitted on NET_OUT link, as shown.

If the packet is neither an SA message or a normal (non-encrypted) packet but an encrypted one defined as "to be scanned," then it is stored in Packet Buffer 540 using leads and data bus P-STO. A command SCAN_REQ is also sent by INPUT process 530 to Secure Content Firewall Scanner 590. The command SCAN_REQ contains a packet pointer, such as a packet number, that allows Secure Content Firewall Scanner 590 to get a copy of the packet for decryption, via P-RD Bus. Once decrypted, the packet copy is checked using standard firewall rules. The result may be either to discard the original packet stored in Packet Buffer 540 or allow its transmission; in either case, Secure Content Firewall Scanner 590 may then discard the scanned copy of the packet.

Alternatively, modification of the packet to conform with firewall rules (or extract only those portions that do not conform with firewall rules, and allow the rest to pass) is also feasible, as would be apparent to one of skill in the art. For example, such packet modification might be implemented by way of a data transmission mechanism from Secure Firewall Content Scanner 590 to block 550.

The SD_AT lead informs OUTPUT Process 550 to send (SD) the packet or Abort (AT) the packet transmission. SD_AT may also include a packet pointer, such as a packet number, in order to identify the packet. A clear CL_GT command can then be sent by OUTPUT Process 550 to clear or fetch the above-mentioned packet, using the packet pointer. In the latter case, the packet can be forwarded from PACKET BUFFER 540 to OUTPUT process 550 using P_FW bus. The packet can then be transmitted on the NET_OUT link via INTF B 560 and the P_OUT bus.

The mechanism just described with respect to FIG. 5 is a one-way mechanism, in that it protects data going from device 100 on WAN 120 to device 140 on private network 130. However, inasmuch as the process of encrypted traffic transmission is asymmetrical for the SA, and for the encrypted traffic itself (which may use different set of keys and parameters), another Secure Firewall Content Scanner chip (or the same if shared), as well as another set of INPUT and OUTPUT processes blocks and Packet Buffer, may be implemented to scan encrypted data transmitted from the direction of device 140 to device 100.

FIG. 6 describes exemplary certificate structures for each device type when certificates are used within the SA process. The certificates 600a and 600b for devices 100 and 140 in FIGS. 6A and 6B can be standard or "true" certificates, as all the parameters included in the certificate fields really belong to those devices. A certificate 600a for device address A as in FIG. 6A is only given to a device located on WAN 120, and a certificate 600b for device address B as in FIG. 6B is only given to a device located on private network 130.

Figure 6A:
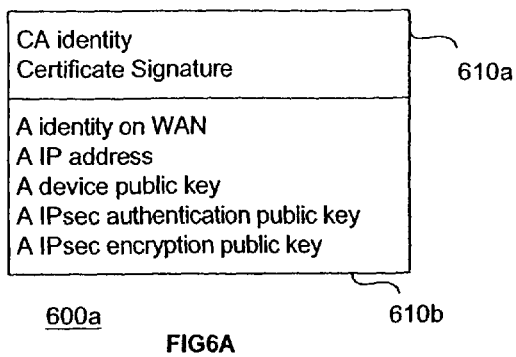
FIGS. 6A-6D describe exemplary certificate structures for each device type when certificates are used within the SA process.

As shown in FIG. 6A, a portion 610a of certificate 600a may contain the certification authority (CA) identity and signature, while a portion 620a contains various information for device 100 having address A, including its identity on the WAN 120, IP address, device public key, IPsec authentication public key and IPsec encryption public key.

Figure 6B:
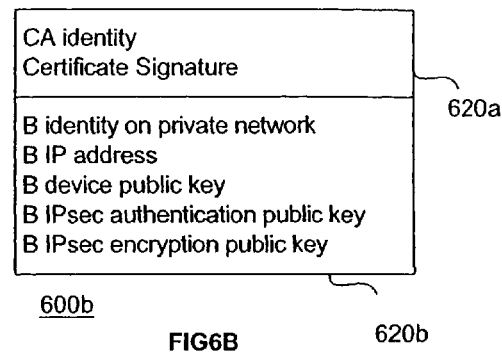

Similarly, as shown in FIG. 6B, a portion 610b of certificate 600b may contain the CA identity and signature, while a portion 620b contains various information for device 140 having address B, including its identity on the private network 130, IP address, device public key, IPsec authentication public key and IPsec encryption public key.

Figure 6C:
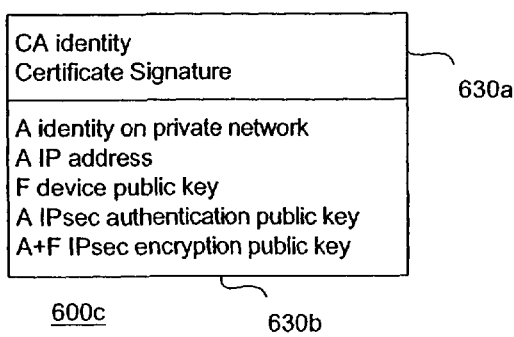

FIG. 6C demonstrates a type of certificate 600c that a device 140 having device address B (or a similarly-situated device) may receive when it requests a certificate for a device such as device 100 having device address A (or a similarly-situated device). A certificate such as 600*c* is a valid "false" certificate, since it is validated by the CA even though it contains some fields with false information in order to work properly. That is, if certificate 600*c* is considered to belong to firewall 110, then firewall 110 is impersonating device 100 having address A in purporting to possess that device's identity (as far as the private network 130 is concerned) and a public encryption key that includes that device's public encryption key plus the firewall's own public encryption key.

Figure 6D:
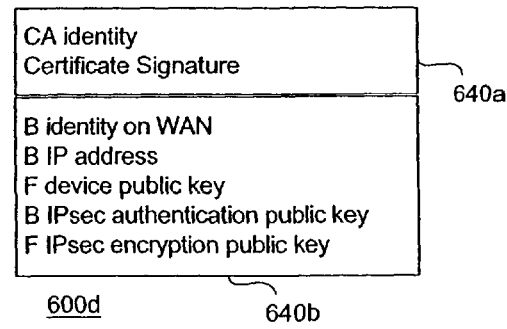

Similar comments apply in the inverse to certificate 600*d* in FIG. 6D. Such a certificate 600*d* allows firewall 110 to impersonate device 140 having address B, but presenting its own device public key and IPsec encryption public key.

FIG. 7 demonstrates a methodology for negotiating a pair of SAs according to an alternate embodiment of the invention.

In FIG. 7, a first SA 710 is established between devices 100 and 140 through firewall 110. A second SA 720 is then established between firewall 1210 and device 140. Devices 100 and 140 first agree, in exchange 730, on an IPsec encryption secret key Ke. Thereafter, this key Ke is encrypted by device 140 using an encryption public key of firewall 110, resulting in PkF(Ke). Then, the encrypted Ke (i.e., PkF(Ke)) is forwarded to firewall 110 by message 740 within SA2 720. Firewall 110 decrypts PkF(Ke) to obtain Ke, and thereafter is free to use Ke to decrypt/scan packets in the manner described above with respect to FIG. 5. Note that, although FIG. 7 describes the case where SA2 is established between devices 110 and 140, it could just as easily be established between devices 100 and 110. Also, in this embodiment, it may be necessary to build and use separate keys for transmissions and receptions between devices 100 and 140. If an operator decides to use this feature, then either device 100 can be used to provide both keys, or the process can be run such that device 140 provides the second key.

In conclusion, the present invention has described a methodology for scanning incoming data without sacrificing the security of the data. In doing so according to one embodiment of the invention, a common secret key is shared between two endpoint devices and a firewall device. Data is received, buffered and copied upon its entry to the firewall; the copy of the data is decrypted and scanned, using the common secret key, in a portion of the firewall that is inaccessible to an operator of the firewall. If the data does not violate any firewall rules, then the original, buffered data may be passed through the firewall while the scanned copy is deleted. Otherwise, both copies may be deleted, and a network administrator and/or the message sender may be notified that a firewall rules violation has occurred.

Although various embodiments of the present invention have been described in detail herein, not all features and/or implementations of the invention have been described. For example, although WAN 120 has primarily been discussed as a public network such as the Internet, it may be a local area network (LAN), a private network, etc. Also, only two end peers are discussed in detail in this description, as IPsec is a point-to-point protocol. However, more devices may be interconnected between them through a firewall. It is also possible that more than one device on one side will establish a secure communication to the same device on the other side, even though each IPsec communication is separate and requires it own corresponding security association.

Thus, it should be apparent that while this invention has been described in various explanatory embodiments, other embodiments and variations can be effected by a person of ordinary skill in the art without departing from the scope of the invention.

What is claimed is:

1. A method for scanning network traffic, comprising:
   forwarding a first data packet from a first device to a second device based on an obtained encryption parameter shared by the first device, the second device, and a separate computer, wherein the encryption parameter is determined based upon a first security association between the first device and the separate computer and a second security association between the second device and the separate computer, wherein the separate computer is adapted to calculate a first secret key associated with the first security association and a second secret key associated with the second security association;
   forwarding a copy of the first data packet to a predetermined portion of the separate computer that is restricted from access by operators of the separate computer;
   scanning the copy of the first data packet to determine compliance with a predetermined criterion associated with the separate computer;
   forwarding the first data packet and deleting the copy of the first data packet if the copy scanned is determined to be in compliance with the predetermined criterion; and
   discarding both the first data packet and the copy of the first data packet if the copy scanned is determined to be in non-compliance with the predetermined criterion.

2. The method of claim 1, wherein the separate computer is adapted to determine that the first data packet is in compliance with the predetermined criterion associated with the separate computer.

3. The method of claim 1, wherein the first data packet is transmitted to the second device via a tunnel mode communication.

4. The method of claim 1, wherein the separate computer is adapted to forward a second data packet encrypted via the encryption parameter from the first device to a third device based on the first security association.

5. The method of claim 1, wherein the separate computer is adapted to decrypt the copy of the first data packet, wherein contents of the copy of the first data packet are restricted to the predetermined portion of the separate computer, wherein the separate computer is adapted for restricting the operators of the separate computer from accessing the contents of the copy of the first data packet.

6. The method of claim 1, wherein the first data packet is scanned for compliance with the predetermined criterion at the predetermined portion of the separate computer, wherein the predetermined portion of the separate computer is adapted to provide only an affirmative response or a negative response regarding compliance with the predetermined criterion.

7. The method of claim 1, further comprising obtaining the encryption parameter, the encryption parameter stored in the separate computer only in a hardware chipset that is not accessible by an administrator of the separate computer.

8. The method of claim 1, further comprising decrypting a copy of the first data packet within the separate computer, wherein the separate computer is adapted to utilize a distinct loop-back address for each of a plurality of devices on a private network that comprises the first device, and wherein the separate computer is adapted to communicatively couple the second device with the plurality of devices on the private network via the first security association.

9. The method of claim 1, further comprising forwarding the first data packet to the second device if a decrypted copy of the first data packet complies with the predetermined criterion, wherein the separate computer is adapted to determine whether to use an IPSec ESP flow process or an IPSec AH flow based upon a check of a protocol field in the first data packet.

10. The method of claim 1, further comprising deleting, at the separate computer, a second data packet transmitted from the first device and the second device based upon a determination of non-compliance of the second data packet with the predetermined criterion.

11. The method of claim 1, further comprising deleting a decrypted copy of the first data packet after the first data packet has been scanned.

12. The method of claim 1, wherein the first data packet is decrypted in a hardware chipset of the separate computer such that contents of the first data packet are inaccessible to any operator of the separate computer.

13. The method of claim 1, further comprising causing the encryption parameter to be generated via:
building a first secret key based upon a first public key sent from the separate computer to the first device during a negotiation of the first security association;
building a second secret key based upon the first secret key and a second public key sent from the separate computer to the second device during a negotiation of the second security association; and
communicating information to the first device that allows the first device to calculate the second secret key using the first secret key, wherein the second secret key is used as the encryption parameter.

14. The method of claim 1, wherein public keys associated with the first device, the second device, or the separate computer are authenticated by virtue of an inclusion of one or more of the public keys on a digital certificate.

15. The method of claim 1, further comprising causing the encryption parameter to be generated via:
building a first secret key based upon a first public key sent from the separate computer to the first device during a negotiation of the first security association;
building a second secret key based upon the first secret key and a second public key sent from the separate computer to the second device during a negotiation of the second security association; and
communicating information to the first device that allows the first device to calculate the second secret key using the first secret key, wherein the second secret key is used as the encryption parameter, and wherein the information includes a public key of the second device.

16. The method of claim 1, further comprising causing the encryption parameter to be generated via:
building a first secret key based upon a first public key sent from the separate computer to the first device during a negotiation of the first security association;
building a second secret key based upon the first secret key and a second public key sent from the separate computer to second device during a negotiation of the second security association; and
communicating information to the first device that allows the first device to calculate the second secret key using first secret key, wherein the second secret key is used as the encryption parameter, wherein the first security association is negotiated between the first device and a first address of the separate computer associated with the first device, and the second security association is negotiated between the second device and a second address of the separate computer associated with the first device.

17. The method of claim 1, further comprising obtaining the encryption parameter via:
negotiating, transparently through the separate computer, the first security association between the first device and the second device;
sharing the encryption parameter between the first device and the second device using the first security association;
negotiating the second security association between the first device and the separate computer; and
sharing the encryption parameter between the first device and the separate computer through the second security association.

18. A device for scanning network traffic, comprising:
a content scanner adapted to scan a copy of a first data packet transmitted from a first device to a second device to determine noncompliance with a predetermined criterion, wherein the scanning of the copy is enabled based on an obtained encryption parameter shared by a first device, a second device, and a separate computer, and wherein the copy of the first data packet is stored in a predetermined portion of the separate computer that is restricted from access by operators of the separate computer;
automatically delete the first data packet transmitted from the first device to the second device and the copy of the first data packet based upon noncompliance with the predetermined criterion being determined, wherein the encryption parameter is determined based upon a first security association between the first device and the separate computer and a second security association between the second device and the separate computer, and wherein the separate computer is adapted to calculate a first secret key associated with the first security association and a second secret key associated with the second security association; and
forwarding the first data packet and deleting the copy of the first data packet based upon compliance with the predetermined criterion.

19. A system for scanning network traffic, comprising:
a firewall device adapted to forward a first data packet from a first device to a second device based on an obtained encryption parameter shared by the first device, the second device, and the firewall device, wherein the firewall device is adapted to decrypt a copy of the first data packet with the encryption parameter shared between the first device, the second device and the firewall device, wherein contents of the copy of the first data packet are restricted to a predetermined portion of the firewall device, wherein the firewall device is adapted to restrict all operators of the firewall device from accessing the contents of the copy of the first data packet, wherein the firewall device is adapted to determine whether to use an IPSec ESP flow process or an IPSec AH flow based upon a check of a protocol field in the data packet, wherein the firewall device forwards the first data packet and deletes the copy of the first data packet if the copy is determined to be in compliance with the predetermined criterion, and wherein the firewall device discards both the first data packet and the copy of the first data packet if the copy scanned is determined to be in non-compliance with the predetermined criterion; and the first device.

20. A non-transitory machine-readable medium comprising machine-implementable instructions for activities for scanning network traffic, comprising:
forwarding a first data packet from a first device to a second device based on an obtained encryption parameter shared by the first device, the second device, and a separate computer, wherein the encryption parameter is determined based upon a first security association between the first device and the separate computer and a second security association between the second device and the separate computer, and wherein the separate computer is adapted to calculate a first secret key associated with the first security association and a second secret key associated with the second security association;

forwarding a copy of the first data packet to a predetermined portion of the separate computer that is restricted from access by operators of the separate computer;

scanning the copy of the first data packet to determine compliance with a predetermined criterion associated with the separate computer;

forwarding the first data packet and deleting the copy of the first data packet if the copy scanned is determined to be in compliance with the predetermined criterion; and discarding both the first data packet and the copy of the first data packet if the copy scanned is determined to be in non-compliance with the predetermine criterion.

* * * * *

UNITED STATES PATENT AND TRADEMARK OFFICE
CERTIFICATE OF CORRECTION

| | | |
|---|---|---|
| PATENT NO. | : 8,136,152 B2 | Page 1 of 1 |
| APPLICATION NO. | : 12/105756 | |
| DATED | : March 13, 2012 | |
| INVENTOR(S) | : Balissat et al. | |

It is certified that error appears in the above-identified patent and that said Letters Patent is hereby corrected as shown below:

On the Title Page, in Field (75), under "Inventors", in Column 1, Line 4, delete "Cagnes sur Mer" and insert -- Cagnes-sur-Mer --, therefor.

Title Page 2, in Field (56), under "OTHER PUBLICATIONS", in Column 2, Line 6, delete "vol.vol." and insert -- vol. --, therefor.

In Fig. 1 A, Sheet 1 of 7, delete "FIG" and insert -- FIG. --, therefor at each occurrence throughout the drawings.

In Column 3, Line 10, delete "phase I" and insert -- phase 1 --, therefor.

In Column 3, Line 13, delete "phase I" and insert -- phase 1 --, therefor.

In Column 6, Line 67, delete "I 10" and insert -- 110 --, therefor.

In Column 10, Line 49, delete "F I" and insert -- F1 --, therefor.

In Column 13, Line 21, delete "1210" and insert -- 110 --, therefor.

In Column 13, Line 26, delete "SA2720." and insert -- SA2 720. --, therefor.

Signed and Sealed this
Fourteenth Day of August, 2012

David J. Kappos
*Director of the United States Patent and Trademark Office*